(12) United States Patent
Van Dyke (10) Patent No.: US 6,428,079 B1
(45) Date of Patent: Aug. 6, 2002

(54) MOTOR VEHICLE FOLDABLE CANOPY

(76) Inventor: Bryce Van Dyke, 4028-122nd Pl. SE., Everett, WA (US) 98208

(*) Notice: Subject to any disclaimer, the term of this patent is extended or adjusted under 35 U.S.C. 154(b) by 0 days.

(21) Appl. No.: 09/689,041

(22) Filed: Oct. 12, 2000

(51) Int. Cl.$^7$ ................................................. B60P 7/02
(52) U.S. Cl. ............................. 296/100.06; 296/26.04; 296/100.01; 296/100.09; 296/100.17
(58) Field of Search .................... 296/10, 159, 163, 296/165, 26.04, 37.5, 37.6, 100.01, 100.06, 100.07, 100.08, 100.09, 100.17

(56) References Cited

U.S. PATENT DOCUMENTS

| | | | | |
|---|---|---|---|---|
| 3,768,858 A | * | 10/1973 | Boismier | 296/100 |
| 3,858,744 A | * | 1/1975 | Garvert | 296/100 X |
| 4,768,824 A | * | 9/1988 | Andonian | 296/165 |
| 4,943,108 A | * | 7/1990 | Turnbull | 296/100 |
| 6,059,350 A | * | 5/2000 | Kooiker | 296/100.09 |
| 6,213,539 B1 | * | 4/2001 | William et al. | 296/181 |

* cited by examiner

*Primary Examiner*—Stephen T. Gordon
*Assistant Examiner*—Lori L Colleta
(74) *Attorney, Agent, or Firm*—Dean A. Craine (57) ABSTRACT

A foldable canopy that, when unfolded, encloses the rear section of a motor vehicle. The canopy comprises two folding, longitudinally aligned canopy members pivotally connected to the opposite sides of the motor vehicle. Each canopy member includes a lower planar member pivotally connected with hinges. The upper and lower planar members are selectively stowed in a stacked, vertical position along the outer sides of the motor vehicle. During use, the lower planar member is raised into a vertical orientation and the upper planar members are extended transversely over the center axis of the bed of the motor vehicle. Two rotating bracing members connect the two upper planar members to the rear surface of the motor vehicle's cab. A horizontally disposed support member also attaches to the rear surface of the motor vehicle's cab to support the front edges of the upper planar members. A water resistant seal is created between the adjoining edges of the upper planar members to prevent water leakage. Optional seals are also provided between the lower planar member and the side walls and between the adjoined lower and upper planar members An optional rear window is also included.

5 Claims, 7 Drawing Sheets

MOTOR VEHICLE FOLDABLE CANOPY

BACKGROUND OF THE INVENTION

1. Field of the Invention

This invention pertains to truck canopies, and, more particularly, to truck canopies that are selectively assembled or disassembled.

2. Description of the Related Art

Sports utility vehicles, known also as SUV's, and pickup trucks are currently very popular, particularly for their ability to transport small amounts of cargo. Pickup trucks are often more useful than SUV's because they carry more cargo in a variety of different shapes and sizes. Pickup trucks are also more desirable for hauling "dirty" cargo, such as dirt, beauty bark, lumber, etc., that is incompatible with the delicate interiors commonly found inside many SUV's.

Many pickup truck owners install a canopy over the bed of the truck to protect cargo from inclement weather, wind, or theft. Although canopies are available in a wide variety of different shapes and designs, they substantially change the overall appearance of the truck, prevent the transport of unusually shaped cargo, and impair the rear view vision. Even though canopies are made of lightweight materials, most owners do not remove the canopy, because two individuals are normally required to lift the canopy off the truck bed and suitable space must be found to temporarily store the canopy.

What is needed is a fully enclosing canopy that can be selectively assembled and disassembled over the motor vehicle. What is also needed is such a canopy that is stored in a compact, collapsed configuration on the motor vehicle without substantially reducing the amount of cargo space.

SUMMARY OF THE INVENTION

It is an object of the present invention to provide a canopy that can be easily assembled and disassembled over a motor vehicle with a bed-like section.

It is an object of the present invention to provide such a canopy that folds into a compact configuration.

These and other objects of the invention, which will become apparent, are met by a foldable canopy that, when unfolded, encloses the rear section of a motor vehicle behind the driver's compartment. The canopy comprises two folding canopy members attached to the opposite sidewalls on the motor vehicle. Each canopy member easily moves from a folded, stacked position located adjacent to the outer surface of the sidewall to a raised, elevated position, extending transversely over the motor vehicle. A brace member and a support bracket disposed attached to the cab on the motor vehicle are used to stabilize and support each canopy member in a fully extended position. An optional first sealing means may be disposed between the upper planar members to provide a water-resistant joint.

Each canopy member includes an upper planar member pivotally attached to a lower planar member. Each planar member is approximately the same length as the section of motor vehicle located behind the cab. Disposed between the upper surface of the motor vehicle's sidewall and the lower surface of the lower planar member is a first pivoting means which enables the lower planar member to be moved between a substantially vertical position over the outside surface of the sidewall to a substantially vertical position directly over the upper surface of the sidewall. A second pivoting means is used to connect the upper surface of the lower planar member to the lower surface of the upper planar member. The second pivoting means enables the upper planar member to be moved from a stacked, side-by-side position next to the lower planar member to a transversely aligned, extended position over the open section of the motor vehicle when the lower planar member is positioned in a substantially vertical position. Optional second and third sealing means are provided between the upper and lower planar members and between the lower planar members and the upper surface of the sidewall, respectively.

When raised and unfolded, the upper planar members extend transversely over the open section of the motor vehicle and meet along their distal edges over the motor vehicle's central, longitudinal axis. A support member connected to the motor vehicle is provided to support the forward edges of the canopy members when placed in a closed position. An optional fourth sealing member is provided between the support member and the canopy members to provide a water-resistant seal therebetween. An optional locking means is provided between the two adjoining upper planar members to hold the two canopy members together. An optional rear window is also provided that extends transversely over the end opening formed between the two adjoining canopy members. The rear window may be selectively attached to the canopy members or be an integral component of the motor vehicle that is raised and lowered from the tailgate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

DESCRIPTION OF THE PREFERRED EMBODIMENT(S)

Referring to the accompanying Figs., there is shown and described a foldable canopy 10 that selectively unfolds to enclose the open area behind the cab 95, hereinafter known as the bed 87 of a motor vehicle, hereinafter known as a pickup truck 85. It should be understood that the invention could be used with other types of motor vehicles having open areas, such as an SUV. The canopy 10 comprises two canopy members 20, 40 that are stacked and aligned on the opposite sidewalls 90, 92 of the truck 85 that unfold to a raised configuration and extend transversely over the bed 87.

Figure 8:
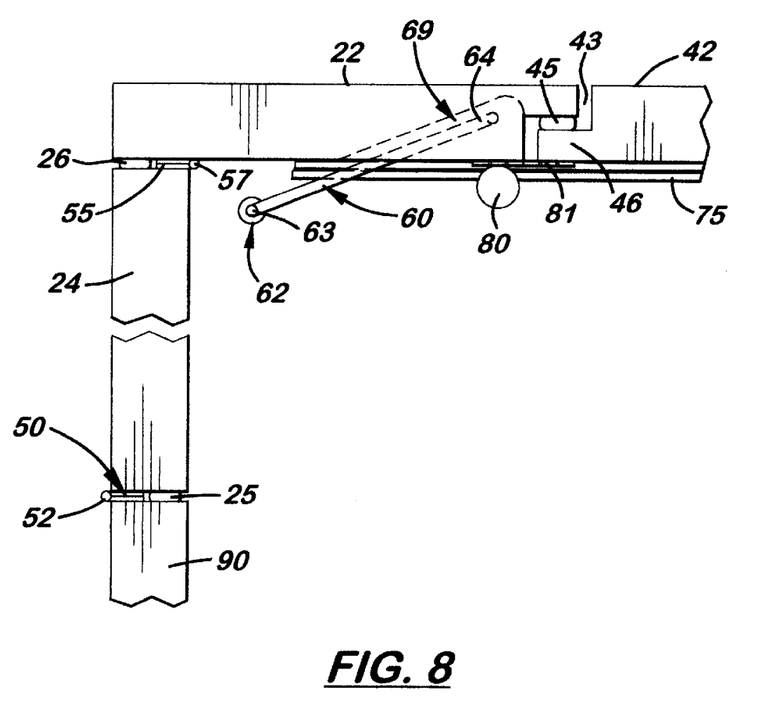
FIG. 8 is a partial, sectional, rear elevational view taken along line 8—8 in FIG. 4 showing two adjoining canopy members in the "closed" position.

Each canopy member 20, 40 includes an upper planar member 22, 42, respectively, and a lower planar member 24, 44, respectively, both longitudinally aligned over the opposite sidewalls 90, 92, respectively, of the bed 87. A first set of hinges 50 are used to pivotally connect the lower surface of the lower planar members 24, 44 to the upper surface of the sidewalls 90, 92, respectively. The pins 52 on the first set of hinges 50 are positioned over the outer, upper surface of the sidewalls 90, 92 and the outer, lower surface of the lower planar members 24, 44 so that the lower planar members 24, 44, respectively, may hang substantially vertically over the outside surfaces of the sidewalls 90, 92 as more clearly shown in FIGS. 2 and 6. As shown in FIG. 8, an optional seal 25 is placed between the upper surfaces of the sidewalls (only sidewall 90 shown) and the lower surface of the lower planar members (only lower planar member 24 shown) to create a water-resistant joint therebetween.

Figure 1:
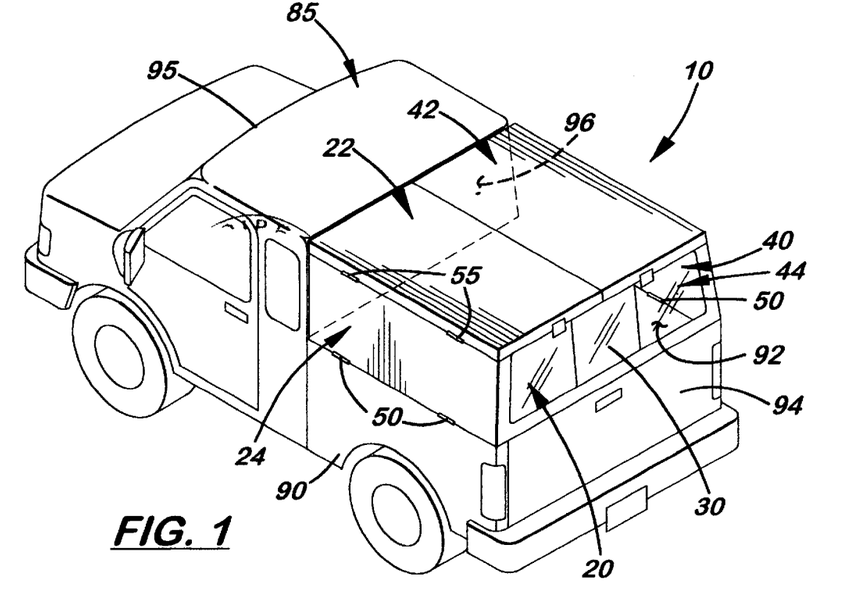
FIG. 1 is a perspective view of the motor vehicle foldable canopy folded into a "closed" position.
Figure 2:
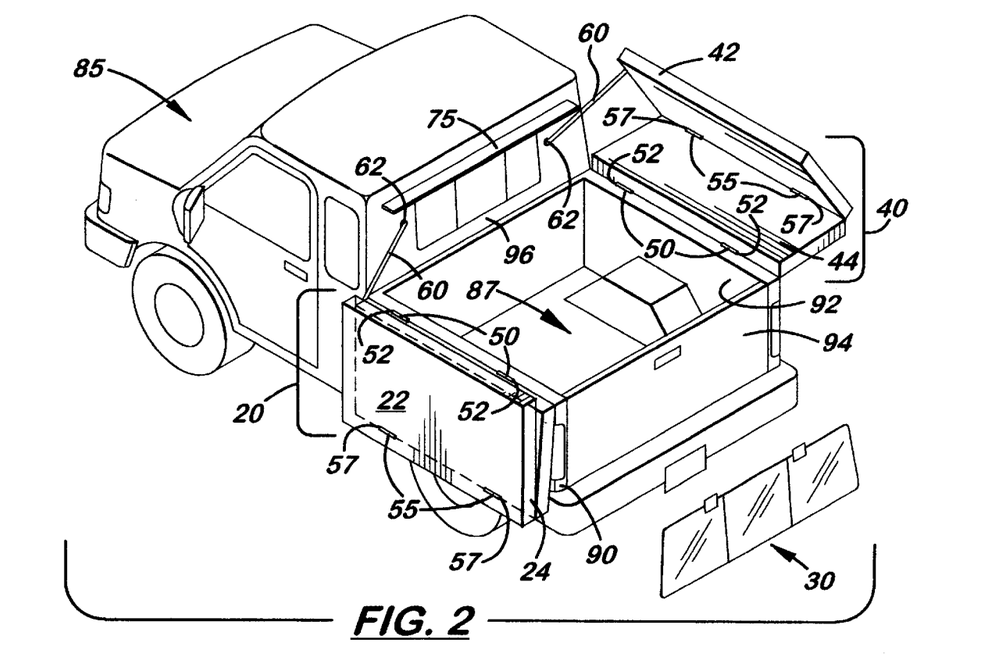
FIG. 2 is a perspective view of the foldable canopy in a partially "open" position.
Figure 3:
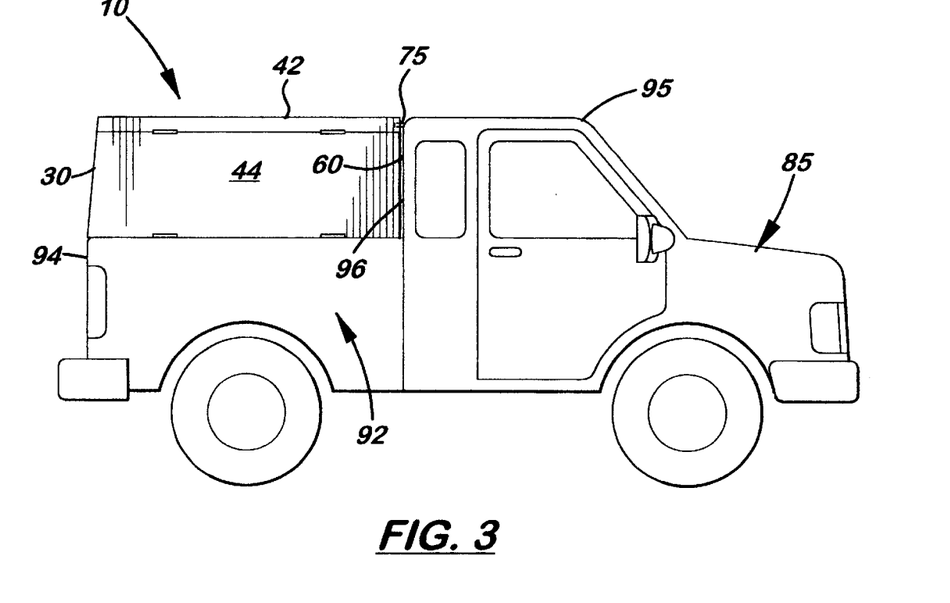
FIG. 3 is a right side elevational view of the foldable canopy in the "closed" position.
Figure 4:
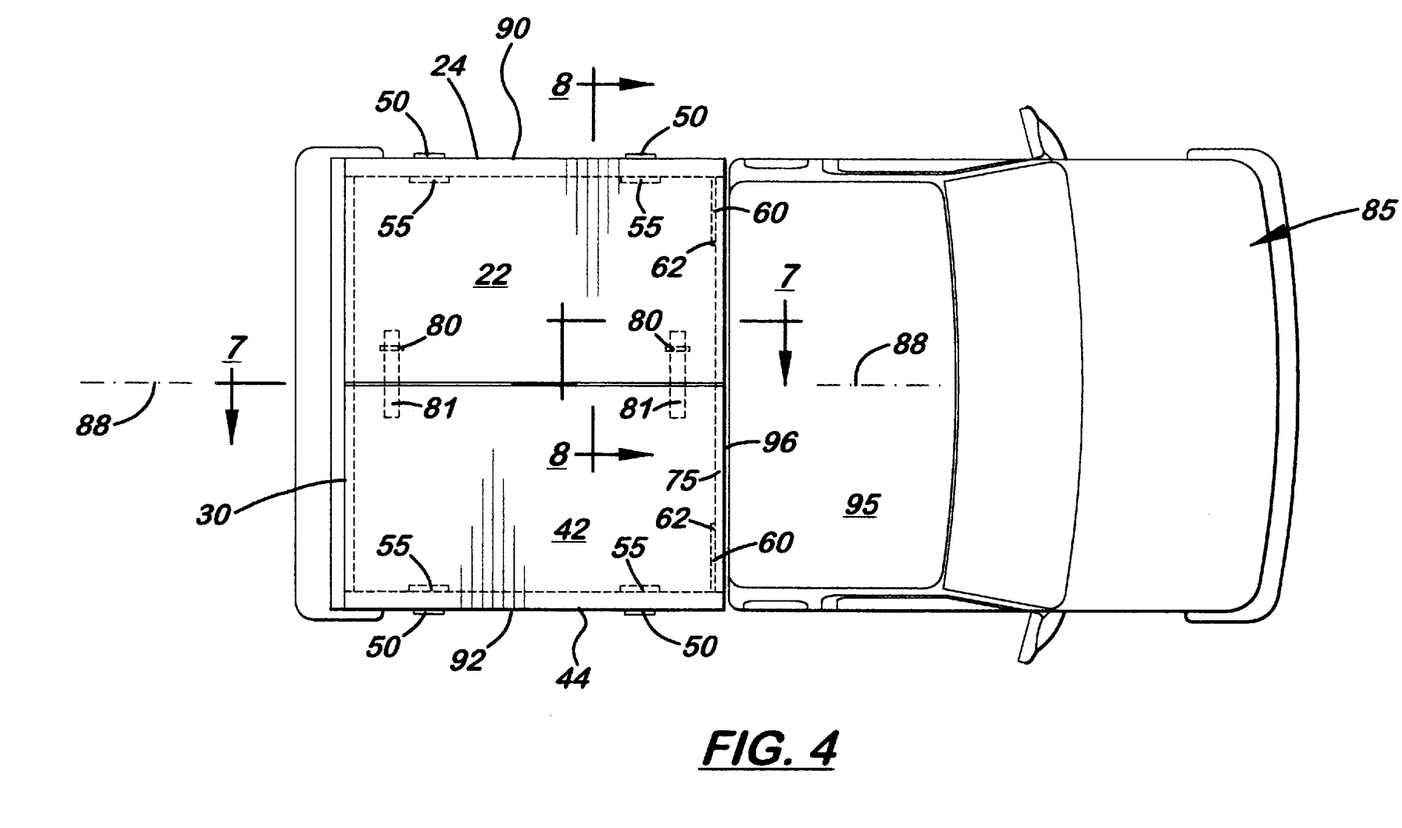
FIG. 4 is a top plan view of the foldable canopy in the "closed" position.
Figure 5:
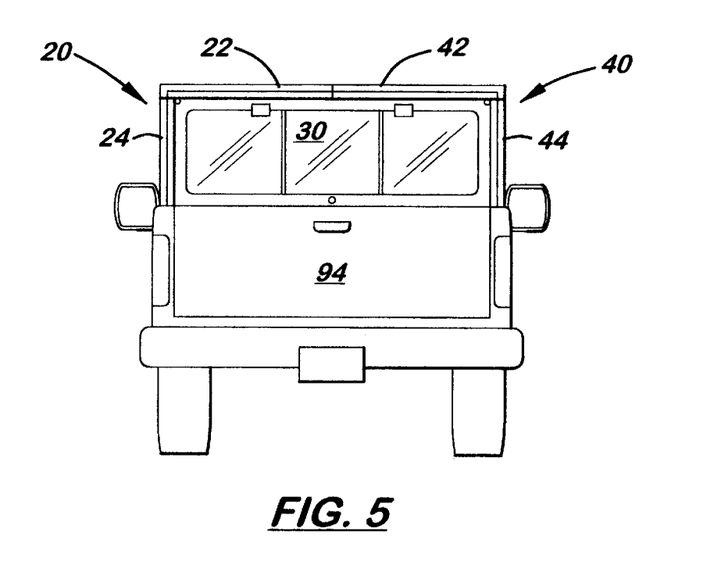
FIG. 5 is a rear elevational view of the foldable canopy in the "closed" position.

The upper planar members 22, 42 are aligned parallel to the lower planar members 24, 44, respectively, when the canopy 10 is folded into the "open", vertically aligned position, as shown in FIG. 2. A second set of hinges 55 is used to pivotally connect the lower surface of the upper planar members 22, 42 to the upper surface of the adjacent lower planar member 24, 44, respectively, so that the upper planar members 22, 42 may extend transversely over the bed 87 as shown in FIGS. 1, 3 and 4 when the lower planar members 24, 44 are vertically aligned. As shown in FIG. 8, an optional seal 26 is placed between the upper surface of the lower planar member (only lower planar member 24 shown) and the lower surface of the upper planar member (only upper planar member 22 shown) to also create a water-resistant joint therebetween. The pins 57 on the second set of hinges 55 are positioned over the inside edge of the adjoining planar members 22, 24 and 42, 44 so that the upper planar member 22 or 42 may fold downward into a stacked position over the lower planar members 24, 44, respectively, as shown in FIGS. 2 and 6.

Figure 6:
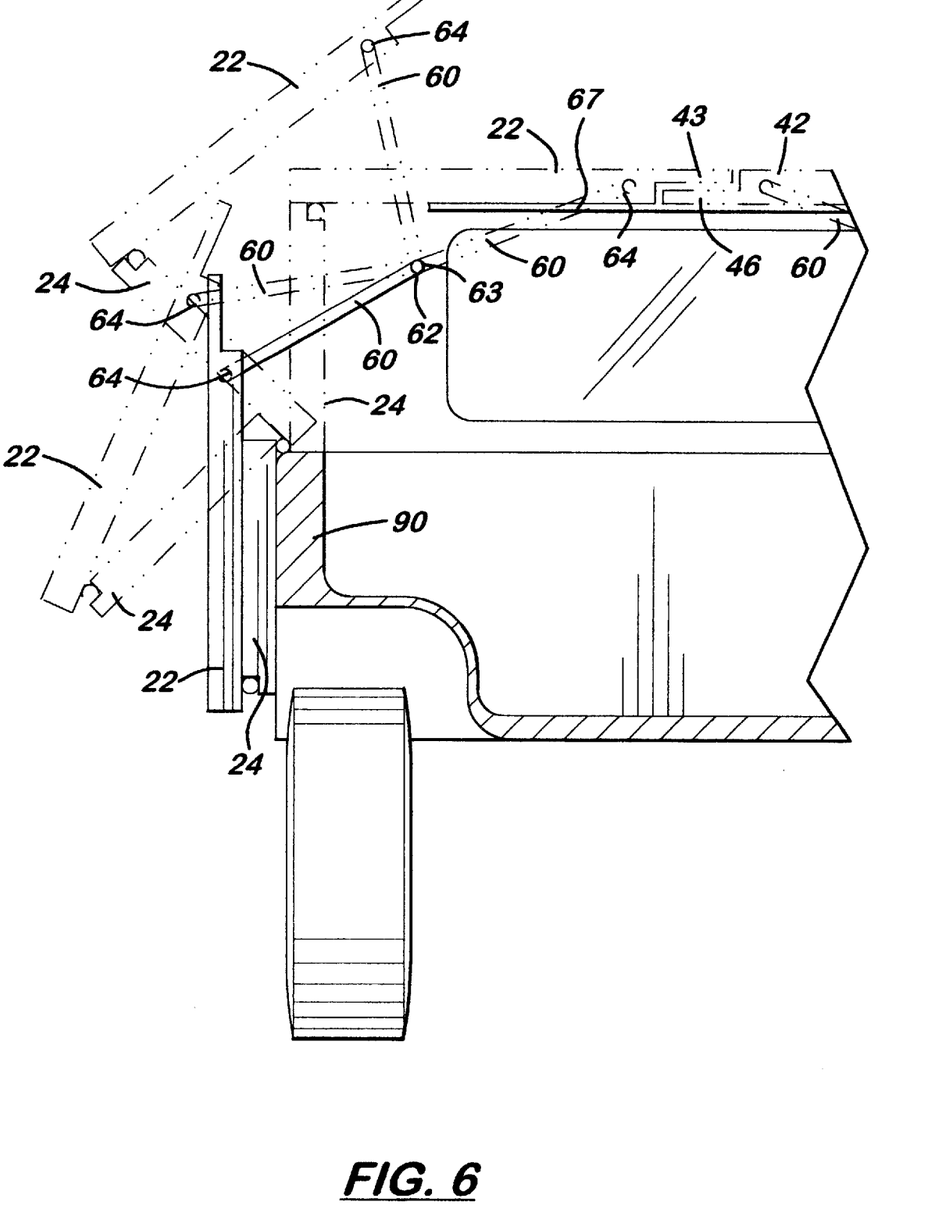
FIG. 6 is a rear elevational view of one canopy member being opened or closed.

As shown in FIGS. 6 and 8, disposed between the rear surface 96 of the cab 95 and the upper planar members (upper planar member 22 shown only) is a rotating brace member 60. The proximal end 63 of each brace member 60 is pivotally mounted to a bracket 62 securely attached to the rear surface 96 of the cab 95. The distal end 63' of the brace member 60 is rotatably mounted to a bolt 66 located inside a pocket 69 formed on the bottom surface of the upper planar member (upper planar member 22 shown only). When adjoined upper and lower planar members 22, 24, and 42, 44, respectively, are folded into stacked positions over the outside surfaces of the sidewalls 90, 92, the brace members 60 rotate and extend downward from the bracket 62 over the rear surface 96 of the cab 95. When the lower planar members 24, 44 are rotated over the sidewalls 90, 92 and the upper planar members 22, 42 are rotated around the lower planar members 24, 44 and extended across the bed 87, the proximal and distal ends 63, 63', respectively, of the brace members 60 rotate around the brackets 62 and bolts 66 to hold the upper planar members 22, 42 in a horizontal position over the bed 87. When extended in this manner, the two brace members 60 support the extended upper edges of the adjoining upper planar members 22, 42 over the central longitudinal axis 88 of the bed 87.

Figure 9:
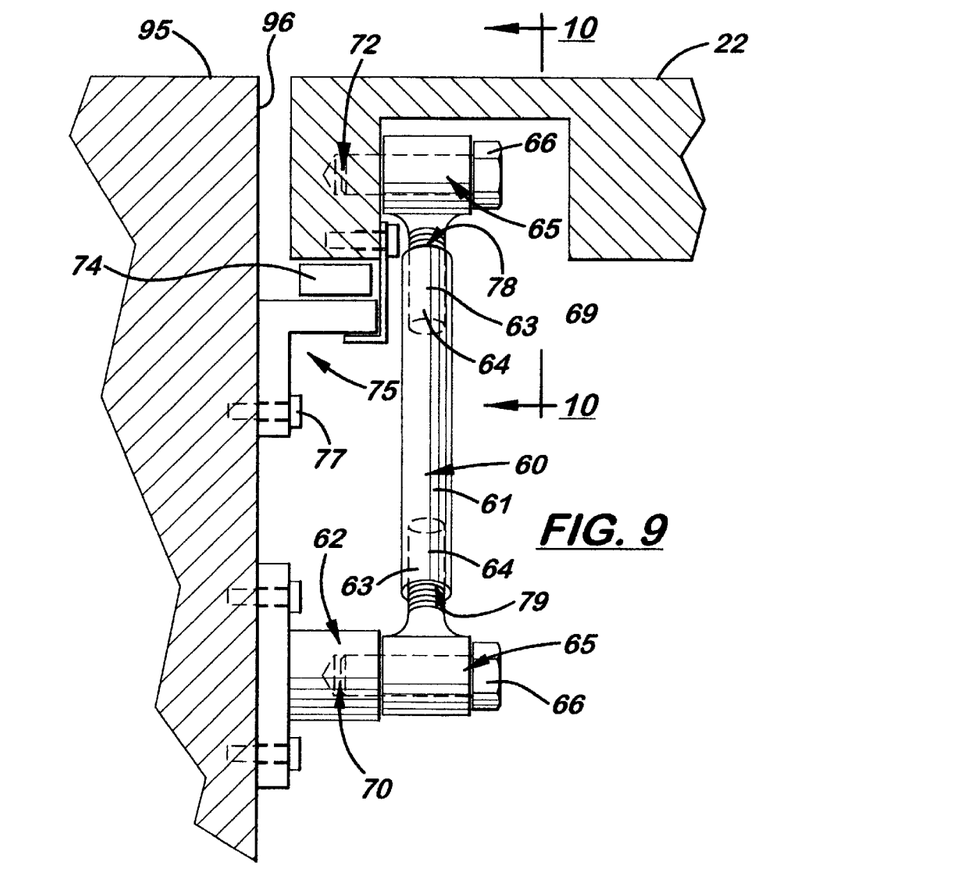
FIG. 9 is an enlarged, sectional, side elevational view of the support bracket, brace member, bracket, and optional holding clip.

As shown in greater detail in FIG. 9, the brace member 60 includes an elongated shaft 61 with two, longitudinally aligned, threaded bores 78, 79 formed on its opposite ends 63, 63'. Attached to each bore 78, 79 is a threaded connector 64, 64', respectively. Each threaded connector 64, 64' includes a bore 65, 65' through which a threaded bolt 66, 66', respectively, may extend. The threads of the bolts 66, 66' connect to threaded bores 70, 72 formed on the brackets 62 and on the inside surface of the pocket 69, respectively, to which bolts 66 may connect.

Figure 10:
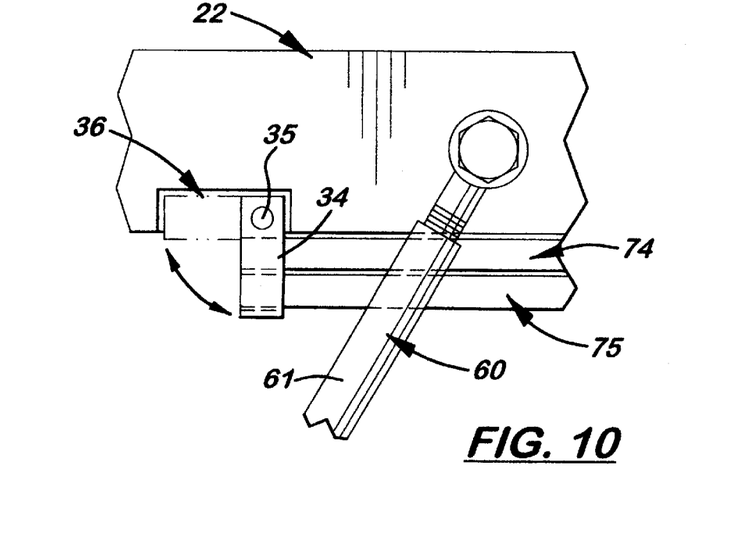
FIG. 10 is a sectional, side elevational view taken along line 10—10 in FIG. 9.

As shown in FIGS. 9 and 10, an optional elongated support member 75 is aligned horizontally and securely attached to the rear surface 96 of the cab 95. The support member 75 is positioned just above the rear window 97 and below the top surface of the cab 95. Suitable connectors 77 are used to connect the support members 75 to the rear surface 96 of the cab 95. During use, the forward edges of the upper planar members 22, 42 are placed over the support member 75 to support the forward edges of the two upper planar members 22, 42. An optional seal 74 is placed between the support member 75 and the lower surfaces of the upper planar members 22, 42.

Also provided is at least one optional clip member 34 that selectively engages the lower surface of the support member 75, as shown in FIG. 10. When the upper planar member 22 is lowered over the support member 75, the clip member 34 is rotated around a pin 35 disposed inside the recessed area 36 formed on the lower surface of the upper planar member (upper planar member 22 shown). During use, the clip member 34 pivots downward and around the end of the support member 75 to securely hold the upper planar member 22 in position over the support member 75. By turning the elongated shaft 61 to adjust its overall length, the downward force exerted by the upper planar member 22 on the support member 75 may be adjusted.

As shown in FIG. 8, the adjoining upper planar members 22, 42 have an opposite aligned, recessed surface 43 and extended lip 46, respectively, which enable the distal edges of the upper planar members 22, 42 to overlap. A suitable seal 45 is then placed between the surface 43 and lip 46 to prevent water leakage. A rotating tongue member 80 is attached to the bottom surface of the upper planar member 22. Attached to the bottom surface of the upper planar member 42 and aligned with the tongue member 80 is a pivoting clasp 81. During use, the clasp 81 is pivoted over the tongue member 80. The tongue member 80 is extended through the slot formed in the clasp 81 and rotated to hold the upper planar members 22, 42 together.

Figure 7:
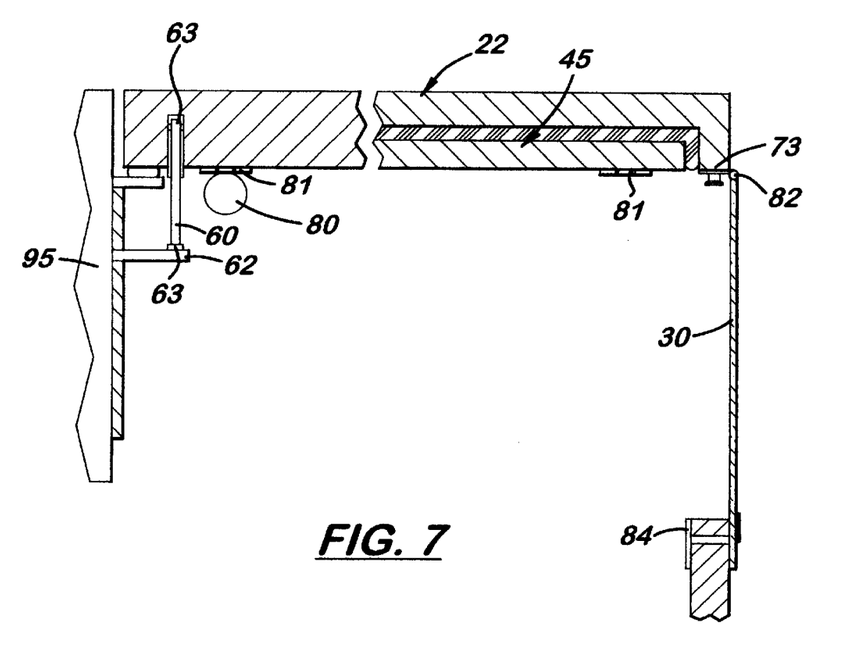
FIG. 7 is a partial, sectional, side elevational view taken along line 7—7 in FIG. 4 showing the relative positions of the adjoining upper planar members in the "closed" position.

As shown in FIGS. 1–5, an optional rear window 30 is selectively attached over the rear opening formed between the two canopy members 20, 40 and directly over the tailgate 94. As shown in FIG. 7, the rear window 30 includes an upper pair of hinges 82 that attach the upper edge of the rear window 30 to the lower surfaces of the two upper planar members 22 and 42. Suitable connectors 73 are provided that selectively connect the hinges 82 to the upper planar members 22, 42. Optional locks 84 are also provided on the lower edge of the rear window 30 which interconnect with the top edge of the tailgate 94. It should be understood that the rear window 30 could be a slide window assembled inside the tailgate 94 that may be selectively raised or lowered.

During assembly, the upper and lower planar members 22, 24 and 42, 44 on each canopy member 20, 40, respectively, are pivotally connected together via the second set of hinges 55. The lower planar members 24, 44 are then aligned on opposites sidewalls 90, 92 of the bed 87 and are connected thereto via the first set of hinges 50. Next, the brackets 62 are attached to the rear surface of the cab 95. The proximal ends 63 of the two brace members 60 are then mounted on the two brackets 62 while the distal ends 63' of the brace members 60 are attached to the pockets 69 on the adjacent upper planar members 22, 42. The upper planar members 22, 42 are then folded over the lower planar members 24, 44 and stored in a stacked, vertical position over the outside surface of the sidewalls 90, 92, respectively.

To form the canopy 10, the upper and lower planar members 22, 24 and 42, 44, respectively, are raised so that the lower planar members 24, 44 are substantially vertically aligned over the sidewalls 90, 92 and the upper planar members 22, 42 are extended transversely over the bed 87. The forward edges of the upper planar members 22, 42 are supported by the support member 75 while the free upper edges of the upper planar members 22, 42 are registered and locked together via the two tongue members 80 and clasps 81 to hold and lock the upper planar members 22, 42 together. The optional rear window 30 may now be placed over the rear opening created between the two canopy members 20, 40.

Figure 11:
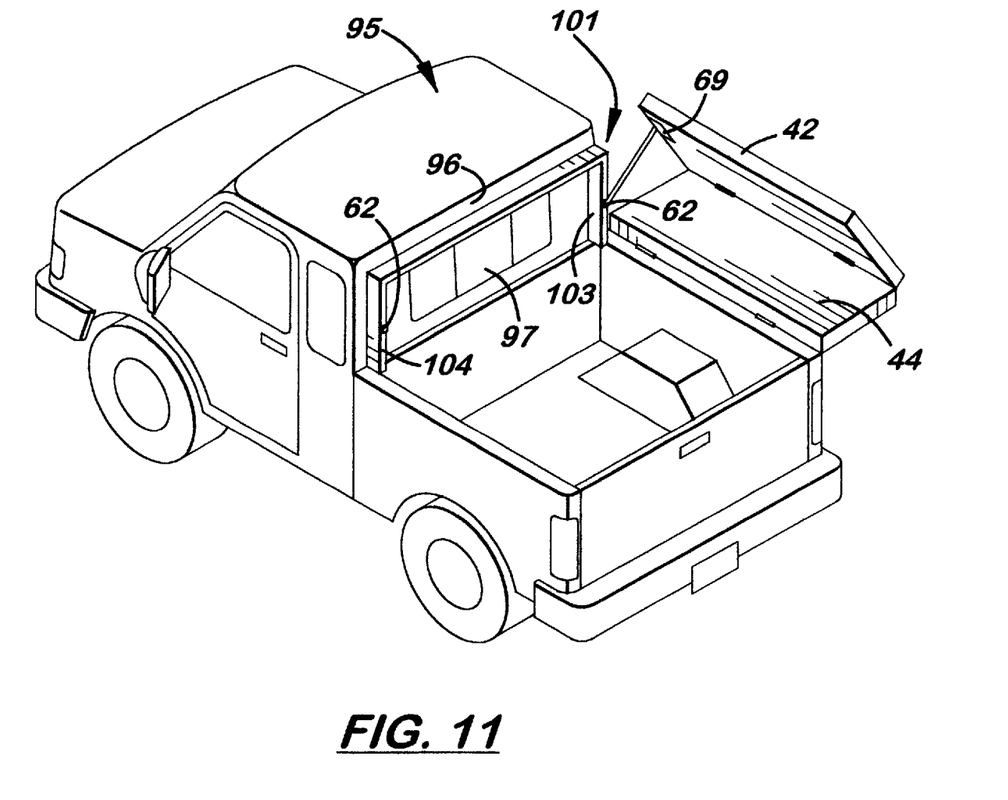
FIG. 11 is a perspective view of a motor vehicle showing one canopy member attached to the motor vehicle and a U-shaped support member attached to the motor vehicle to support the canopy member in a closed position.

FIG. 11 discloses a second embodiment of the support member 101 being an inverted, U-shaped component with a horizontal member 102 and two vertical leg members 103, 104. The support member 101 may be attached directly to the rear surface 96 of the cab 95 or to the top surface of the sidewalls 90, 92. The brackets 62 may be attached to the vertical leg members 103, 104.

In the preferred embodiment, the upper and lower planar members 22, 42 and 24, 44 are made of fiberglass or similar material approximately 48 to 72 inches in length depending on the length of the bed 87. The lower planar members 24, 44 measure approximately 16 to 30 inches in width and 1 to 2 inches in thickness. The upper planar members 24, 44 measure approximately 24 to 48 inches in width and 1 to 2 inches in thickness. The support member 75 measures approximately 48 to 60 inches in length and each bracket 62 measures approximately 16 to 30 inches in length and ¼ to ½ inch in diameter. The extended lip 46 measures approximately 1 inch in width and the seals 25, 26, and 45 are made of silicone or rubber.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

Further, the purpose of the foregoing abstract is to enable the U.S. Patent and Trademark Office personnel, patent bar practitioners, and the general public, to determine quickly from a cursory inspection the nature and essence of the technical disclosure of the application. The Abstract is neither intended to define the invention of the Application, which is measured by the claim, nor is it intended to be limiting as the scope of the invention in any way.

I claim:

1. A foldable canopy for use in conjunction with a motor vehicle having a cab and a bed surrounded by two opposite sidewalls, said canopy comprising:

a. two folding canopy members, each pivotally connected to one of two opposite sidewalls on the motor vehicle, each of said canopy member including an upper and lower planar member pivotally connected together to fold into a vertically stacked configuration over the sidewalls and unfolded to a raised, extended position over the bed of the motor vehicle to form an enclosure thereover;

b. a first sealing means between opposite said canopy members to create a water resistant joint therebetween when said canopy members are disposed in the raised, extended position over said bed on said motor vehicle;

c. a second sealing means disposed between said lower planar members and the sidewall of said motor vehicle to create a water-resistant joint therebetween when said canopy member is unfolded to the raised, extended position over said bed of said motor vehicle;

d. a third sealing means disposed between said lower planar member and said upper planar member pivotally connected together to create a weather-resistant joint therebetween when said canopy member is unfolded to the raised, extended position over said bed of said motor vehicle;

e. a bracing means to support each of said canopy members in the raised, extended position over the motor vehicle bed, said bracing means comprised of an elongated bracing member being pivotally connected at one end to a surface of said cab on said motor vehicle and pivotally connected at an opposite end to said upper planar member on each of said canopy member;

f. a support member attached to said motor vehicle to support each said canopy member in an unfolded, raised, extended position; and, g. a locking means to hold said upper planar member together when unfolded to the raised, extended position.

2. The foldable canopy, as recited in claim 1, including a rear window disposed between said canopy members when said canopy members are unfolded to the raised, extended position.

3. The foldable canopy, as recited in claim 2, wherein said rear window is selectively attached to said canopy members when said canopy members are unfolded to the raised, extended position.

4. The foldable canopy, as recited in claim 1, further including a fourth sealing means disposed between said support member and said upper planar members to create a water resistant seal therebetween when said canopy members are unfolded to the raised, extended position.

5. A foldable canopy for use in conjunction with a motor vehicle having a cub and a bed surrounded by two opposite sidewalls, said canopy comprising:

a. two folding canopy members each pivotally connected to one of two opposite sidewalls on the motor vehicle, each of said canopy member including an upper and lower planar member pivotally connected together to fold into a vertically stacked configuration over said adjacent sidewalls and unfolded to the raised, extended position over the bed of the motor vehicle to form an enclosure thereover;

b. a first set of hinges disposed between each pair of adjacent said upper and lower planar members to pivotally connect them together;

c. a second set of hinges attached to each of said lower planar member capable of securing said lower planar member to said adjacent sidewall thereby enabling said lower planar member to rotate around said adjacent sidewall between a stacked position against said adjacent sidewall and a substantially vertical position over said adjacent sidewall;

d. a support member capable of being attached to the cab to support each of said upper planar member in the raised, extended position;

e. a bracing means to support each of said canopy members in the raised, extended position over the motor vehicle bed, said bracing means comprised of an elongated bracing member being pivotally connected at one end to a surface of said cab on said motor vehicle and an opposite end to the upper planar member on each of said canopy member;

f. a sealing means between opposite canopy members to create a water resistant seal therebetween when said canopy members are disposed in the raised, extended position over said bed on said motor vehicle;

g. a locking means disposed between said upper planar member when unfolded to a raised, extended position over the bed of the motor vehicle; and, h. a rear window aligned transversely over said bed and between said folding canopy members.

* * * * *